United States Patent

[11] 3,618,137

[72] Inventors Raymond C. Bassett
54 Holiday Drive;
William R. Chesnut, 37 Laurel Place, both of Caldwell, N.J. 07006
[21] Appl. No. 7,885
[22] Filed Feb. 2, 1970
[45] Patented Nov. 2, 1971

[54] MOVABLE MAGNETIC COUPLING
20 Claims, 7 Drawing Figs.
[52] U.S. Cl. .................................................. 335/285
[51] Int. Cl. .................................................. H01f 7/20
[50] Field of Search .................................... 335/285, 286, 287; 269/8

[56] References Cited
UNITED STATES PATENTS
2,823,340  2/1958  Pierce .......................... 335/286
3,110,847  11/1963  Ott et al. ........................ 335/285
3,488,615  1/1970  Yando .......................... 335/285
3,531,746  9/1970  Spodig ......................... 335/286

Primary Examiner—Bernard A. Gilheany
Assistant Examiner—F. E. Bell
Attorney—Popper, Bain & Bobis ABSTRACT: A movable magnetic coupling comprising a magnetized surface and a magnetized, movable rotor magnetically adhered to the surface, the surface having parallel, magnetic fields of alternate polarity which magnetically interact with similar, parallel magnetic fields of alternate polarity on the movable rotor, the magnetic interaction constantly aligning the rotor in a continuously parallel orientation with respect to a reference line in the surface yet permitting free translational movement of the rotor both by rotation about its axis and by sliding parallel to its axis without substantial magnetic resistance.

PATENTED NOV 2 1971 3,618,137

INVENTOR.
RAYMOND C. BASSETT
BY WILLIAM R. CHESNUT

Pepper, Brun + Boke

ATTORNEY 3,618,137

MOVABLE MAGNETIC COUPLING

BACKGROUND OF INVENTION

The present invention relates to a unique, movable, magnetic coupling comprising a magnetized surface and a magnetized, movable member magnetically attached to the surface. The magnetic coupling exhibits the following characteristics:

a. The movable member is supported by at least one axially elongated, generally cylindrical rotatable rotor which is magnetically adhered to the surface although not necessarily in physical contact therewith;

b. The axis of the rotor supporting the movable member always assumes an orientation parallel to a reference line on the surface irrespective of its location on the surface due to the interacting magnetic fields, the rotor resisting angular displacement from the said parallel orientation during rotation of the rotor about an axis vertical to its rotational axis;

c. The rotor is free to roll over the surface in a direction perpendicular to its rotational axis smoothly in infinitesimally small increments without substantial magnetic interference;

d. The rotor may be slid along the surface parallel to its axis of rotation and direction of orientation without magnetic interference other than friction between it and the surface generated by the vertical forces of magnetic attraction between the surface and the rotor itself.

A magnetic coupling of the character described has many applications. One such application is in drafting arts for providing a drafting head for a drafting board.

A wide variety of drafting boards with drafting heads associated therewith are well known. All of these boards have one problem in common; the drafting head is mechanically attached to the board and cannot be removed without dismantling mechanical parts. In addition, such mechanically attached drafting heads frequently include complex parts which require periodic adjustment and are subject to damage.

The movable, magnetic coupling described and claimed herein may be employed in the form of a drafting board and drafting head to obviate problems inherent in drafting boards with mechanically attached drafting heads. The magnetic surface may be employed as a drafting board and the movable member as a carrier for the drafting head. The carrier is magnetically attached to the board and may be totally removed from the board without mechanical detachment. Thus, the drafting surface may be completely cleared for the replacement of drafting paper, the interchange of drafting heads or the employment of the drafting board for other purposes or for rapid movement from point to point.

The magnetic interaction between the magnetized surface and at least one magnetized rotor on the head carrier provides a magnetic action equivalent to a mechanical rack and pinion. The head will always be oriented in a parallel position with respect to a reference line on the drafting surface to generate parallel lines. Yet, the head will be freely movable both parallel to and perpendicular to the axis of orientation without substantial magnetic interference.

For convenience, a drafting board and drafting head combination have been employed as an embodiment of the movable magnetic coupling claimed herein. However, the claims of this application are not limited to this one embodiment but include all embodiments of the basic magnetic coupling.

SUMMARY OF INVENTION

A movable magnetic coupling comprising, a magnetized surface, a magnetized, movable member magnetically attached to and movable over the surface; a plurality of parallel, magnetic fields of alternate polarity on the magnetized surface; at least one, axially rotatable, elongated cylindrical rotor supporting the magnetized movable member; a plurality of generally peripheral, axially parallel, magnetic fields of alternate polarity and equal number on the rotor, like poles of both the surface and rotor being of equal width and the fields on the rotor and surface being registerable as the rotor axially over the surface.

PREFERRED EMBODIMENT OF INVENTION

The objects and advantages aforesaid as well as other objects and advantages may be achieved by the movable magnetic coupling claimed herein a preferred embodiment of which relating to the drafting arts is illustrated in the drawings in which:

Figure 1:
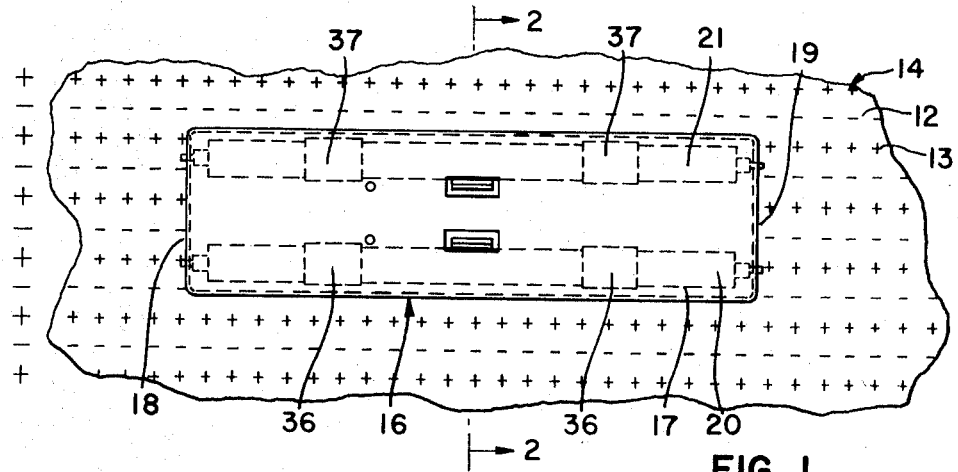
FIG. 1 is a top plan view of a drafting board and drafting head carrier.

Referring now to the drawings in detail, the movable magnetic coupling as embodied in the drafting arts comprises a drafting board 11 having a plurality of linear, spaced-apart magnetic fields of alternate polarity 12 and 13. The magnetic fields, 12 and 13, have a finite width and like polar fields have the same width although unlike fields may have different widths. Nevertheless, it is preferably that both north magnetic fields 12 and south magnetic fields 13 be of the same finite width.

The means for establishing the magnetic fields 12 and 13 are optional. It is necessary to employ a magnetizable material which can be formed into a sheet. For example, there is available today, a magnetizable rubber composition impregnated with barium ferrite crystals and formed into sheets manufactured by the Minnesota Mining and Manufacturing Company. In a preferred embodiment of the invention illustrated in FIG. 2, the drafting board 11 is overlayed with a magnetizable composition sheet 14. The sheet is magnetized in linear, parallel spaced-apart magnetic fields of alternate polarity 12 and 13. The sheet 14 is supported by a magnetically permeable metallic sheet 15 which lays on top of the drafting board 11. The magnetically permeable sheet 15 enhances the strength of the magnetic fields 12 and 13 by closing the air gap across the back of the poles.

The drafting head comprises a movable carrier 16 consisting of a channeled housing 17 closed on its opposed ends 18 and 19.

A pair of axially elongated, cylindrical rotors 20 and 21 are rotatably mounted in spaced-apart parallelism between the opposed ends 18 and 19 of the housing 17.

Each of the rotors 20 and 21 comprises an inner steel tube core 22 and a peripheral magnetizable sheet 23 similar to sheet 14. The peripheral sheet 23 is impressed with a plurality of magnetic fields of alternate polarity 24 and 25 parallel to each other and the axis of rotation of the rotor.

As in the case of the fields 12 and 13 of the sheet 14, the fields 24 and 25 are of finite width and like fields must be of the same or equal width. In addition, the magnetic fields 24 and 25 on the rotor must engage unlike fields 12 and 13 on the sheet 14 in vertical registration as the rotors 20 and 21 rotate over the sheet 14 with the axis of rotation of the rotors parallel to the longitudinal axis of the fields of the sheet 14. In addition, each rotor 20 and 21 must contain an equal number of north and south polar fields 24 and 25.

Thus, there is a relationship between the spacing of centerlines of like magnetic poles on the sheet 14 and the diameter of the rotors 20 or 21. The diameter of the rotors are equal to the number of like poles on the periphery of the rotor times the pitch spacing of centerlines of like poles on the sheet 14 divided by $\pi$.

The rolling action of the rotors 20 and 21 and the interactions of their peripheral fields 24 and 25 with fields 12 and 13 on the sheet 14 is analogous to a mechanical rack and pinion movement.

When a single rotor 20 or 21 is positioned on the magnetized sheet 14, with the axis of the rotor generally parallel to the axis of the magnetic fields 12 and 13 on the sheet 14, the fields 24 and 25 on the rotor align with those of opposite polarity on the sheet 14. The interaction of magnetic fields of opposite polarity between the sheet 14 and either of the rotors 20 and 21 maintain the axis of the rotor in alignment with the axis of the fields 12 and 13 on the sheet 14. Any tendency to skew the axis of rotation of the rotors 20 and 21 from the longitudinal axis of the fields 12 and 13 on the sheet 14 is resisted.

If the strength distribution of magnetic fields 12 and 13 on the sheet 14 and the magnetic fields 24 and 25 on the respective rotors 20 and 21 exhibited a true sinusoidal harmonic configuration, there would be a smooth magnetic rack and pinion interengagement between the rotors 20 and 21 and the sheet 14 as the rotors roll across the sheet with the axis of rotation parallel to the axes of the fields on the sheet 14. However, it has been found that as a practical matter, both the magnetic fields 12 and 13 on the sheet 14 and 24 and 25 on the respective rotors 20 and 21 tend more to a square wave configuration with a rapid diminuation of the fields at the point of reversal of polarity. As a result, the interaction between opposite poles on the rotors and sheet varies as each rotor rolls across the sheet 14 thereby producing uneven attraction. While such a rotor may function, it is nevertheless advantageous to provide a pair of spaced apart axially parallel rotors on the carrier 16 to dampen this tendency towards irregular magnetic attraction as the rotors roll across the sheet 14.

Figure 2:
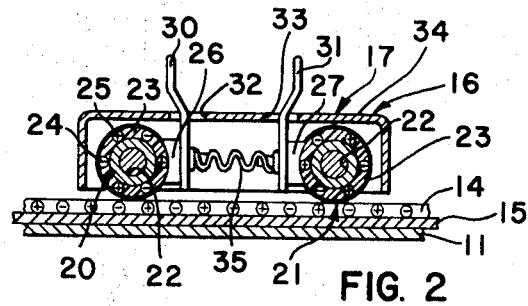
FIG. 2 is an end elevational, cross-sectional view of the carrier and drafting board taken along line 2—2 in FIG. 1.
Figure 3:
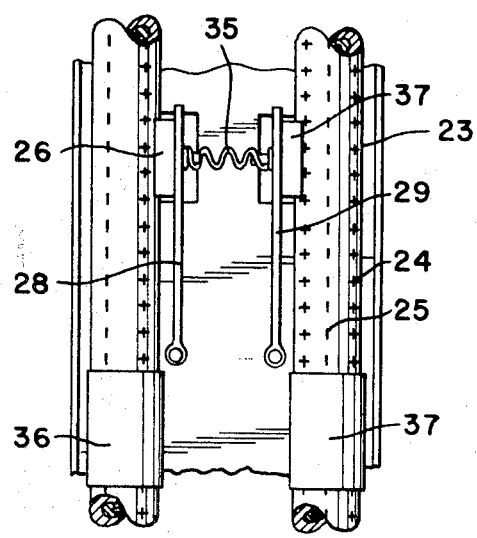
FIG. 3 is an enlarged, broken away, top plan view of a rotor brake mechanism associated with the drafting head carrier.

The purpose for the pair of rotors 20 and 21 is to average in opposite directions variations in magnetic attraction between the fields on the sheet 14 and on the rotors 20 and 21 thereby providing a relatively smooth interaction between opposing fields as the rotors roll across the sheet 14. In order to accomplish this end, the spacing between the rotors 20 and 21 is critical. The basic object to be achieved by the spaced-apart rotors 20 and 21 is to insure that when the center lines of opposing fields between one of the rotors and the sheet 14 are in vertical registration, the centerline of the magnetic field on the other rotor bifurcates or is in vertical registration with the line of demarcation of opposing fields of the sheet 14. Thus, as illustrated in FIG. 2, the north polar field of rotor 20 is in precise vertical registration with the south polar field of the sheet 14. Nevertheless, the line of demarcation between fields of opposing polarity on rotor 21 is in vertical registration with the line of demarcation between fields of opposite polarity on the sheet 14.

Thus, the centered distance, $d$, between rotors 20 and 21 may be determined by the following equation:

$$d = nA \pm \frac{A}{2}.$$

where: $A$ = center distance between parallel fields 12 and 13.
where: $n$ = any even integer such that $d$ is larger than the diameter of the rollers.

Experimentally, it has been determined that for a pitch spacing between like poles of one-half inch and a rotor diameter of 0.4775 inch corresponding to three north and three south poles, that a center distance between rotors of 1.375 inches proved satisfactory producing a net effect of little or no noticeable variation in the force required to roll the carrier 16 across the sheet 14 when rotation of the rotors were in alignment with the longitudinal axes of the fields 12 and 13 on the sheet 14.

In operation, the carrier 16 is applied to the sheet 14 on the drafting board 11 so that the axes of rotation of the rotors 20 and 21 are generally in parallel alignment with the magnetic fields 12 and 13 on the sheet 14. If the axes of the rotors 20 and 21 are substantially at a skew or angle to the axes of the fields 12 and 13, little or no magnetic attraction between the rotors and the sheet 14 is noticed.

However, as the angle of skew between the rotors 20 and 21 and the fields 12 and 13 is reduced to a minimum, a strong magnetic attraction developes rapidly aligning the carrier 16 in a "snap" action. The "snap" magnetic action immediately precisely orients the rotors 20 and 21 with the fields 12 and 13 on the sheet 14 where the magnetic attraction is strongest. The rotors 20 and 21 rotate to their position of greatest attraction. Thus, one of the rotors 20 or 21 will rotate so that opposite fields on the rotor and the sheet will be in vertical registration with the other rotor having the bifurcation between respective opposing fields of both the rotor and sheet in vertical registration.

If the movable magnetic coupling claimed herein is to be employed in the drafting arts, there must be means for securing against translational movement perpendicular to the axes of the rotors 20 and 21 by means of their rotation. Thus, any convenient means of locking the rotors 20 and 21 against rotation may be provided. One such means is illustrated in FIGS. 1 and 2 and comprises a pair of spaced-apart brake pads 26 and 27. The brake pads are attached to a pair of generally horizontal pivotal brake arms 28 and 29. The brake arms 28 and 29 are provided with a pair of generally vertical levers 30 and 31 extending upwardly through slots 32 and 33 of the top 34 of carrier 16. The pads 26 and 27 are normally urged apart and into engagement with the respective rotors 20 and 21 by means of an intermediate spring 35.

As the carrier 16 is brought into engagement with the sheet 14, the levers 30 and 31 are compressed towards each other releasing the pads 26 and 27 from engagement with the rotors 20 and 21. The rotors 20 and 21 are thus free to rotate under the influence of magnetic attraction to assume their position as illustrated in FIG. 2. The brake levers 30 and 31 may then be released locking the rotors 20 and 21 in that position.

There is no magnetic resistance to movement of the carrier 16 axial to the rotors 20 and 21 along the magnetic fields 12 and 13 of the sheet 14 and 24 and 25 of the rotors 20 and 21. However, it is desirable to provide a pair of spaced-apart low-resistance contact sleeves 36 and 37 on the rotors 20 and 21. The carrier 16 may then freely slide parallel to the respective magnetic fields 12 and 13 and 23 and 24 with little or no resistance.

The carrier 16 may be moved perpendicular to the longitudinal axes of the fields 12, 13, 24 and 25 by releasing the brake pads 26 and 27. Magnetic interaction between the rotors 20 and 21 and the fields 12 and 13 on the sheet 14 will maintain the carrier in precise parallel alignment notwithstanding movement of the carrier perpendicular to the axes of the said magnetic fields by rolling of the rotors 20 and 21. The rolling force needed produced by the pairs of rotors in synchronous rotation with the centers of opposite attraction with the centers of polar change.

Figure 4:
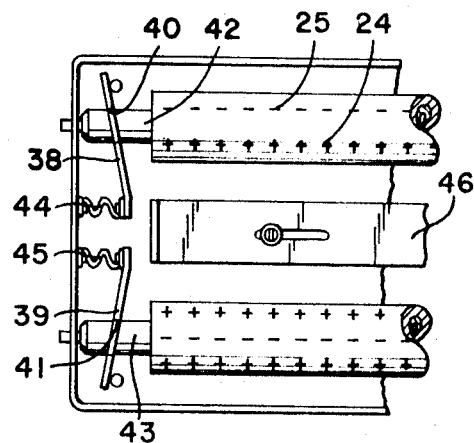
FIG. 4 is an enlarged, broken away, top plan view of an alternate brake mechanism.

Another form of carrier 16 is illustrated in FIG. 4 wherein the brake comprises a pair of pivotal levers 38 and 39 having openings 40 and 41 respectively through which shafts 42 and 43 respectively of the rotors pass, springs 44 and 45 urge the periphery of the openings 40 and 41 into locking engagement with the shafts 42 and 43. A slidable brake releasing bar 46 which may be manipulated from the top of the carrier 16 is engageable with the ends of the levers 38 and 39 to bring them into perpendicularity with the axles 42 and 43 thereby relieving the locking action.

The magnetic attraction between the fields 23 and 24 on the rotors 20 and 21 and 12 and 13 on the sheet 14 is very sharply defined there being little or no attraction between the rotors and the sheet when there is any substantial angle between them. Thus, it is advantageous to provide means on the carrier 16 for locating the position of parallelism between the respective fields. Such a locating device is illustrated in FIG. 5.

Figure 5:
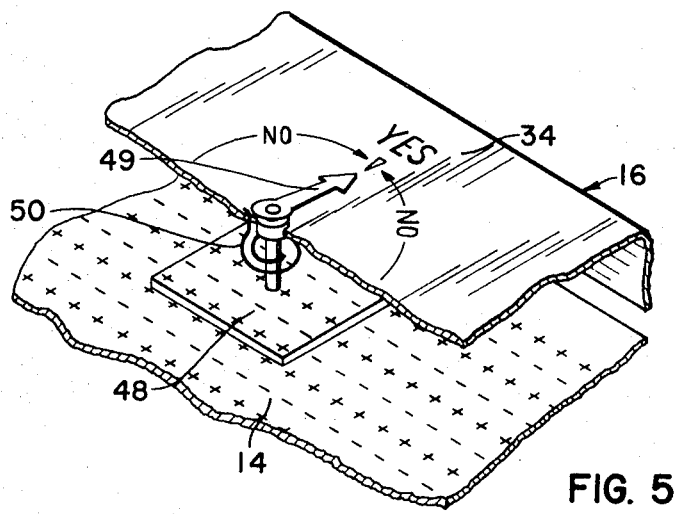
FIG. 5 is an enlarged, broken away view in perspective of the drafting head carrier illustrating a magnetic alignment indicator.

Referring now to FIG. 5, the carrier 16 is provided with a rotatable shaft 47 which extends vertically through the top 34 of the carrier 16. A magnetic sheet 48 is connected to the bottom of the shaft 47. The sheet 48 contains a plurality of spaced apart, parallel magnetic fields of alternate polarity precisely as spaced in the sheet 14. An indicator needle 49 is mounted on the top of the shaft 47. Yes-no indicia are printed on the top 34 of the carrier 16 at the end of the needle 49.

An offsetting spring 50 is connected between the shaft 47 and the top 34 of the carrier 16 normally maintaining the needle 49 pointing toward the "no" notation. When the sheet 48 is placed closely to sheet 14, aligns with poles in parallel orientation to the poles 12, 13 on the sheet 14.

In operation, when the carrier is layed onto the sheet 14 in such a manner that the axes of the fields 12 and 13 and 24 and 25 are not parallel, the needle 49 will be deflected away from the "yes" notation into one of the two "no" regions on opposite sides thereof. As the carrier 16 is rotated, the needle 49 will move toward or away from the "yes" indicia by means of the magnetic interaction between the plate 48 and the sheet 14. The carrier 16 is merely rotated until the needle 49 points toward the "yes" indicia whereupon an immediate strong magnetic attraction will generate and the snap alignment will occur.

Figure 7:
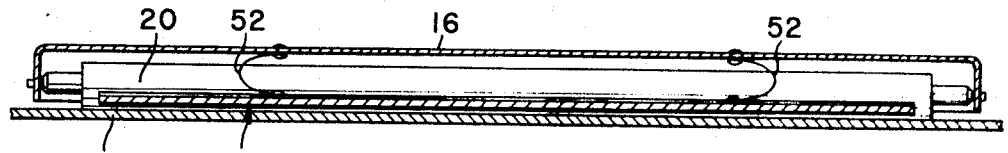
FIG. 7 is a side elevational cross-sectional view of the carrier illustrated in FIG. 6 taken along lines 7—7 looking in the direction of the arrows.
Figure 6:
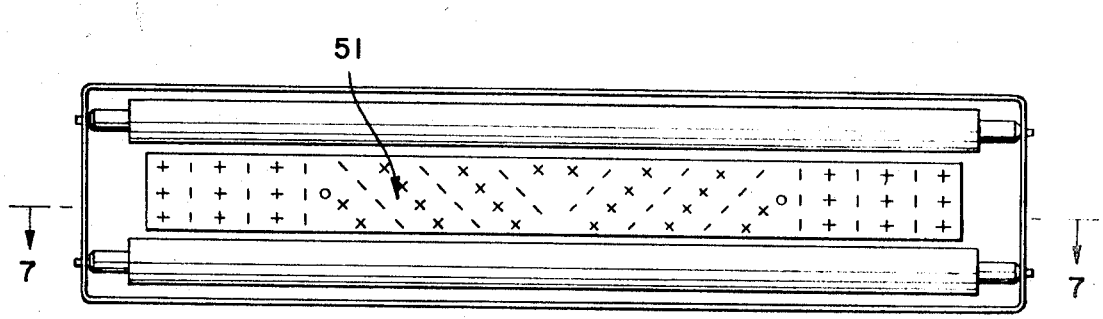
FIG. 6 is a bottom plan view of an alternate form of drafting head carrier including a slip security panel.

While the carrier 16 is magnetically attached to the sheet 14 when the respective magnetic fields 12, 13 and 24, 25 are in parallel alignment, there is little or no magnetic attraction when they are substantially out of alignment. In many instances, the carrier may be removed from the drafting board 11 altogether and layed down in a position wherein the rotors 20 and 21 are substantially skewed from the axes of the magnetic fields 12 and 13. Since there is little or no magnetic attraction under such circumstances, the carrier might slip on a drafting board 11 which was inclined. Therefore, it is advantageous to provide slip security means to prevent accidental slipping of the carrier 16 under these conditions. Such slip security means are illustrated in FIGS. 6 and 7.

A slip security panel 51 is mounted in a floating manner on the carrier 16 by means of springs 52—52. The springs 52—52 normally space the panel 51 away from the lower more peripheries of the rotors 20 and 21 thereby maintaining an air gap.

The slip security panel 51 is provided with four magnetized sections generally symmetrically arranged. Two of the sections contain parallel magnetic fields of alternate polarity perpendicular to the axes of rotation of the rotors 20 and 21. There are also two sections in which there are parallel magnetic fields of alternate polarity positioned at 45° angles in opposite directions to the axes of rotations of the said rotors. Thus, the slip security panel will be in a position to become attracted by the magnetic fields 12 and 13 on the sheet every 45° of rotation of the carrier. When the carrier 16 orients itself into one of the eight positions representing 45° increments around a circle, the slip security panel will be attracted downwardly toward the sheet 14 engaging and providing frictional means for securing the carrier 16 against sliding off the drafting board. Of course, the orientation locating means illustrated in FIG. 4 may be employed to properly orient the axes of rotation of the rotors 20 and 21 to the magnetic fields 12 and 13 of the sheet 14.

One of the great advantages of a drafting head employing the movable magnetic coupling described and claimed herein lies in the fact there need be no direct engagement between the rotors 20 and 21 of the carrier 16 and the sheet 14. Magnetic attraction is quite sufficient with an air gap of a nonpermeable magnetic gap of as much as one-sixteenth of an inch.

While the drawings have illustrated the magnetic coupling claimed herein as embodied in a drafting instrument, it may also be employed in a wide variety of arts including computer driven X-Y plotters requiring low inertia moving members as well as the transmission of rectilinear motion through walls or membranes. The illustration of a specific embodiment of the mechanical coupling in the form of a drafting head is not in limitation of the claims presented herein.

The foregoing description is merely intended to illustrate an embodiment of the invention. The component parts have been shown and described. They each have substitutes which may perform a substantially similar function; such substitutes may be known as proper substitutes for the said components and may have actually been known or invented before the present invention.

We claim:
1. A movable magnetic coupling comprising,
   a. a magnetized surface,
   b. a magnetized movable member movable over the surface while magnetically attached thereto,
   c. a plurality of parallel, magnetic fields of alternate polarity on the magnetized surface,
   d. at least one, axially rotatable, elongated cylindrical rotor on the magnetized movable member,
   e. a plurality of peripheral, axially parallel, magnetic fields of alternate polarity on the rotor, there being an equal number of fields of like polarity,
   f. fields of like polarity on the magnetized surface and on rotor being of equal width,
   g. fields on the rotor and surface being vertically registerable as the rotor rotates over the surface perpendicular to the axis of the fields on the surface.
2. A movable magnetic coupling comprising,
   a. the structure in accordance with claim 1 and
   b. means for releasably restraining the rotor against rotation.
3. A movable magnetic coupling comprising,
   a. the structure in accordance with claim 1 and
   b. means on the movable members for detecting and indicating the orientation of the magnetic fields in the said surface.
4. A movable magnetic coupling comprising,
   a. the structure in accordance with claim 2 and
   b. means on the movable members for detecting and indicating the orientation of the magnetic fields in the said surface.
5. A movable magnetic coupling comprising,
   a. the structure in accordance with claim 1 and
   b. at least two, axially rotatable, elongated cylindrical rotors on the movable member,
   c. a plurality of generally peripheral, axially parallel, magnetic fields of alternate polarity on each rotor, there being equal numbers of fields of like polarity,
   d. fields of like polarity of the magnetized surface and both rotors being of equal width, and
   e. fields on each rotor being registerable with fields of opposite polarity on the surface as the rotors rotate over the surface perpendicular to the axis of the fields thereon,
   f. the rotors being spaced apart a distance sufficient to permit the centerline of fields on one rotor to lie in vertical registration with the centerline of fields of opposite polarity on the surface while the bifurcation between fields on the other are in vertical registration with the bifurcation between fields on the surface while the rotors rotate over the surface perpendicular to the axis of the fields on the surface.
6. A movable magnetic coupling comprising,
   a. the structure in accordance with claim 5 and
   b. means for releasably restraining the rotors against rotation.
7. A movable magnetic coupling comprising,
   a. the structure in accordance with claim 5 and
   b. means on the movable member for detecting and indicating the orientation of the magnetic fields in said surface.
8. A movable magnetic coupling comprising,
   a. the structure in accordance with claim 6 and
   b. means on the movable member for detecting and indicating the orientation of the magnetic fields on said surface.
9. A movable magnetic coupling comprising,
   a. the structure in accordance with claim 1 and
   b. low-friction bearing means between the surface and at least a portion of the rotor.
10. A movable magnetic coupling comprising,
   a. the structure in accordance with claim 5 and b. low-friction bearing means between the surface and at least a portion of each rotor.

11. A movable magnetic coupling comprising,
a. the structure in accordance with claim 1 and
b. a magnetized panel vertically resiliently mounted on the movable member normally spaced away from the surface,
c. the panel being magnetically attractable into engagement with the surface in at least one nonparallel orientation with respect to the axis of the fields on the surface.

12. A movable magnetic coupling comprising,
a. the structure in accordance with claim 5 and
b. a magnetized panel vertically resiliently mounted on the movable member normally spaced away from the surface,
c. the panel being magnetically attractable into engagement with the surface in at least one nonparallel orientation with respect to the axis of the fields on the surface.

13. A movable magnetic coupling comprising,
a. the structure in accordance with claim 11 in which,
b. the panel has a plurality of parallel magnetic fields of alternate polarity, fields on the panel having the same width as fields of opposite polarity on the surface.

14. A movable magnetic coupling comprising,
a. the structure in accordance with claim 12 in which,
b. the panel has a plurality of parallel magnetic fields of alternate polarity, fields on the panel having the same width as fields of opposite polarity on the surface.

15. A movable magnetic coupling comprising,
a. the structure in accordance with claim 9 in which,
b. the low-friction bearing means are at least one band of low-friction material attached to the rotor.

16. A movable magnetic coupling comprising,
a. the structure in accordance with claim 10 in which,
b. the low-friction bearing means are at least one band of low-friction material attached to each rotor.

17. A movable magnetic coupling comprising,
a. the structure in accordance with claim 11 and
b. means for releasably restraining the rotor against rotation,
c. means on the movable member for detecting and indicating the orientation of the magnetic fields on said surface, and
d. low-friction bearing means between the surface and at least a portion of the rotor.

18. A movable magnetic coupling comprising,
a. the structure in accordance with claim 12 and
b. means for releasably restraining each rotor against rotation,
c. means on the movable member for detecting and indicating the orientation of the magnetic fields on said surface, and,
d. low-friction bearing means between the surface and at least a portion of each rotor.

19. A movable magnetic coupling comprising,
a. the structure in accordance with claim 17 in which,
b. the detecting and indicating means are a generally vertical shaft mounted for rotation on the movable member, having a plurality of parallel magnetic field of alternate polarity,
c. a magnetized sheet mounted on the bottom of the shaft and magnetically attractable by the surface when the rotor is supported thereon, and
d. an indicator on the opposite end of the shaft.

20. A movable magnetic coupling comprising,
a. the structure in accordance with claim 18 which,
b. the detecting and indicating means are a generally vertical shaft mounted for rotation on the movable member,
c. a magnetized sheet having a plurality of parallel magnetic fields of alternate polarity mounted on the bottom of the shaft and magnetically attractable by the surface when the rotors are supported thereon, and
d. an indicator on the opposite end of the shaft.

* * * * *